No. 733,520. PATENTED JULY 14, 1903.
H. TREMBLAY.
BAR SPRING EYEGLASS FRAME.
APPLICATION FILED FEB. 21, 1903.
NO MODEL.

Witnesses:
C. F. Wesson
M. E. Regan

Inventor:
H. Tremblay.
By his Attorneys
Southgate & Southgate

THE NORRIS PETERS CO., PHOTO-LITHO., WASHINGTON, D. C.

No. 733,520. Patented July 14, 1903.

UNITED STATES PATENT OFFICE.

HORMIDAS TREMBLAY, OF SOUTHBRIDGE, MASSACHUSETTS, ASSIGNOR OF ONE-HALF TO HORMIDAS L. BEDARD, OF SOUTHBRIDGE, MASSACHUSETTS.

BAR-SPRING EYEGLASS-FRAME.

SPECIFICATION forming part of Letters Patent No. 733,520, dated July 14, 1903.

Application filed February 21, 1903. Serial No. 144,403. (No model.)

*To all whom it may concern:*

Be it known that I, HORMIDAS TREMBLAY, a citizen of the United States, residing at Southbridge, in the county of Worcester and State of Massachusetts, have invented a new and useful Bar-Spring Eyeglass-Frame, of which the following is a specification.

This invention relates to that class of eyeglass-frames in which lenses are movable in a straight line toward and away from each other as distinguished from the ordinary or older form of eyeglass-frames in which lenses are supported in the arms of a spring-yoke.

The especial objects of this invention are to provide a strong, simple, durable, and inexpensive form of eyeglass-frame in which the parts are assembled and secured together without soldering and which can be dismantled or taken apart whenever it is desired to renew or replace any of the pieces thereof.

To these ends this invention consists of a bar-spring and of a combination of parts therein, as hereinafter described, and more particularly pointed out in the claims at the end of this specification.

Figure 1:
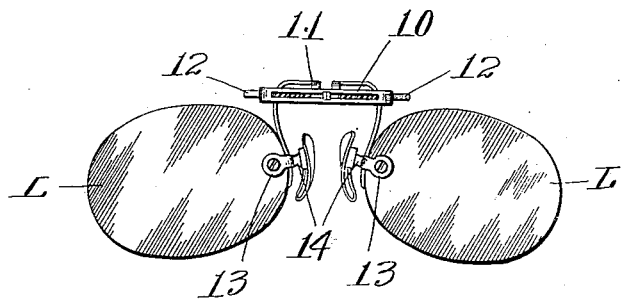
Figure 2:
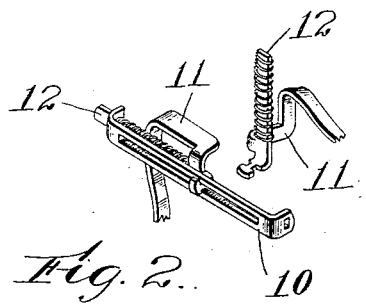
Figure 3:
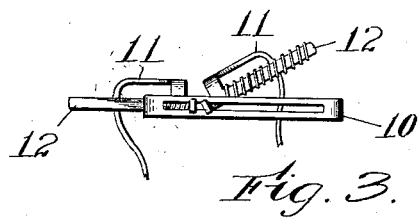
Figure 4:
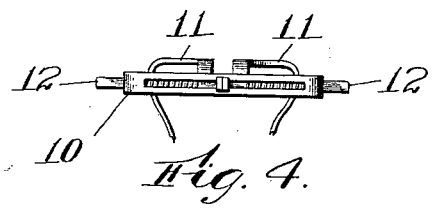
Figure 5:
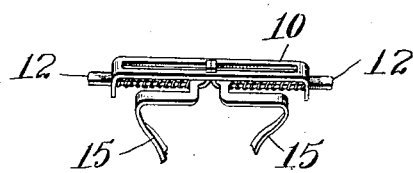
Figure 6:
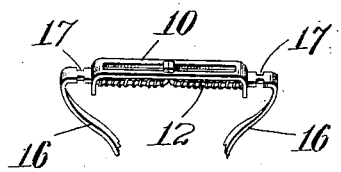

In the accompanying drawings, Figure 1 is a front view of a pair of eyeglasses provided with a bar-spring constructed according to this invention. Fig. 2 is an enlarged perspective view with one of the lens-carrying slides detached from its center piece. Fig. 3 is a front view showing the manner in which the parts are assembled. Fig. 4 is an enlarged front view showing the parts in their normal position. Fig. 5 is a perspective view illustrating a modified construction, and Fig. 6 is a perspective view illustrating a second modified form of construction.

In the older and less expensive forms of eyeglasses the lenses are connected by a spring-yoke, and the tension of this spring is relied upon to hold glasses in place. This ordinary form of eyeglass-frame has been found to be objectionable in some cases, as the lenses will be more or less inclined with respect to each other according to the shape of the nose of the wearer. This is especially objectionable with the use of high-priced, especially-ground lenses, in the use of which it is desirable that the lenses shall not be tipped or tilted to different angles with respect to each other. To overcome this objection and at the same time to provide a more uniform pressure for holding the eyeglass-frames in place on the nose of the wearer, a number of eyeglass-frames have been devised in which bar-springs are employed—that is to say, in constructions of this class small spiral springs are used for the lens-carrying slides, which slides are movable toward and away from each other in a straight line.

The especial object of my present invention is to provide a bar-spring eyeglass-frame the parts of which may be stamped out by machinery and which may be put together without soldered or riveted joints, the parts of a complete frame constructed according to my invention being detachable without bending or springing any of the parts out of place, so that the construction may be taken apart whenever it is to be repaired or parts thereof replaced.

To accomplish these ends, a bar-spring eyeglass frame constructed according to my invention comprises a longitudinal slotted guide-piece with lens-carrying slides which are removably mounted in the guide-piece. Each of the lens-carrying slides is preferably provided with a T-shaped head which engages the slot of the guide-piece and with a rod or arm which slides through a bearing at one end of the guide-piece. The springs are coiled upon the rods or arms of the lens-carrying slides, and the parts are so proportioned that the springs will hold the slides in operative position; but by moving the T-head of a lens-carrying slide toward the farther end of the slot in the guide-piece the rod or arm of said slide will be moved out of its bearing, so that said lens-carrying slide may then be turned and its T-head disengaged from its slot, permitting the construction to be taken apart.

Referring to the drawings for a detail description of the construction as illustrated in Fig. 1, 10 designates a longitudinally-slotted sheet-metal guide-piece having turned-back ends which are perforated or provided with bearings. Combined with the sheet-metal guide-piece 10 are the sheet-metal lens-carrying slides 11, each of which is provided with a T-shaped head for engaging the slot of the guide-piece 10 and with a rod or arm 12, which extends through a bearing at the end of the guide-piece 10. The lens-carrying arms, which extend down from the slides 11, are provided with ears 13, which receive the lens or glasses L in the ordinary manner, and extending in from these arms are the usual posts or studs 14, carrying the nose-pads, which may also be of the usual construction.

The manner in which an eyeglass-frame constructed according to this invention is assembled is most clearly illustrated in Figs. 2, 3, and 4. Starting with the parts in the position illustrated in Fig. 2, the T-shaped head of the lens-carrying slide 11 which is to be secured is first inserted through the slot of the guide-piece 10. The parts are then moved to one end of the slot of the guide-piece 10, as shown in Fig. 3. This shifting of both lens-carrying slides to one end of the slot in the center piece 10 I regard as a feature of importance, because when the parts are in this position without springing, straining, or bending any of the pieces the slide 11 can be turned to lock its T-shaped head in the slot and to introduce the end of its rod or arm 12 through its bearing at the end of its guide-piece 10, so that the parts will then occupy their assembled or normal position. (Illustrated in Fig. 4.)

In the first four figures of the drawings the slotted guide-piece 10 is illustrated as occupying a vertical position. In some cases it is desirable to have the guide-piece 10 arranged horizontally, so that it will have less tendency to obstruct the vision. This is best illustrated in Fig. 5. As shown in this figure, the lense-carrying slide 15 may be provided with one less bend or angle than the form of lens-carrying part illustrated in the first four figures of the drawings. In some cases also the arms which carry the lenses may be formed by prolongations of the slides 12. A construction embodying this feature is shown in Fig. 6, in which the arms 16 are separated from body portions of the slides by notched or reduced sections 17 for permitting the parts to be introduced into their bearings at the ends of the guide-piece 10.

I am aware that other changes may be made in practicing my invention by those who are skilled in the art without departing from the scope thereof as expressed in the claims. I do not wish, therefore, to be limited to the constructions I have herein shown and described; but What I do claim, and desire to secure by Letters Patent of the United States, is—

1. As an article of manufacture, a bar-spring for eyeglasses, comprising a metal center piece having perforated ends at right angles with its body portion, and having a single longitudinal slot extending substantially the entire length of its body portion, and two metal slides, each having an arm extending through the perforation at one end of the center piece, and each having a T-head which is movable in the slot of the center piece to the opposite side of the middle point of the center piece from that which is normally occupied thereby, and springs mounted on the arms, whereby each of the slides may have its T-head entered into the slot of the center piece and moved therein to the opposite side of the middle point from that normally occupied thereby to permit its arm to be turned into line with one of the end perforations of the center piece and entered therein without bending or springing any of the parts.

2. As an article of manufacture, a bar-spring for eyeglasses, comprising a metal center piece having perforated ends at right angles with its body portion, and having a single longitudinal slot extending substantially the entire length of its body portion, and two metal lens-carrying slides, each having a spring-receiving arm, a lens-carrying arm, and a T-head normally located on the opposite side of the center piece from said arms, and movable in the slot of the center piece to the opposite side of the middle point of said slot from that normally occupied by said T-head, whereby by entering the T-head alone through the slot of the center piece and carrying the T-head to the opposite side of the middle point of the slot from that normally occupied thereby, the spring-carrying arm may be brought into line with and entered into an end bearing of the center piece without springing or bending any of the parts.

In testimony whereof I have hereunto set my hand in the presence of two subscribing witnesses.

HORMIDAS TREMBLAY.

Witnesses:
PHILIP W. SOUTHGATE,
J. ELMER HALL.